(12) United States Patent
Yan et al.

(10) Patent No.: US 11,008,469 B2
(45) Date of Patent: May 18, 2021

(54) ANTI-CORROSION COATING WITH LOW THROUGH-HOLE RATIO FOR STEEL REBARS AND COATING METHOD

(71) Applicant: Zhejiang University, Hangzhou (CN)

(72) Inventors: Dongming Yan, Hangzhou (CN); Yi Liu, Hangzhou (CN); Luodong Zhang, Hangzhou (CN); Haibo Gao, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 15/747,762

(22) PCT Filed: Mar. 1, 2017

(86) PCT No.: PCT/CN2017/075324
§ 371 (c)(1),
(2) Date: Jan. 26, 2018

(87) PCT Pub. No.: WO2017/148388
PCT Pub. Date: Sep. 8, 2017

(65) Prior Publication Data
US 2018/0298201 A1 Oct. 18, 2018

(51) Int. Cl.
| | | |
|---|---|---|
| *C09D 5/08* | (2006.01) |
| *C09D 7/43* | (2018.01) |
| *C09D 1/00* | (2006.01) |
| *C23D 5/02* | (2006.01) |
| *C03C 8/00* | (2006.01) |
| *B05D 7/14* | (2006.01) |
| *B05D 1/18* | (2006.01) |

(Continued)

(52) U.S. Cl.
CPC ............... *C09D 5/084* (2013.01); *B05D 1/18* (2013.01); *B05D 3/002* (2013.01); *B05D 3/0272* (2013.01); *B05D 7/14* (2013.01); *C03C 8/00* (2013.01); *C09D 1/00* (2013.01); *C09D 1/04* (2013.01); *C09D 5/08* (2013.01); *C09D 7/43* (2018.01); *C23D 5/02* (2013.01); *C23D 3/00* (2013.01)

(58) Field of Classification Search
CPC . C09D 4/084; C09D 7/43; C09D 5/08; C09D 1/00
See application file for complete search history.

(56) References Cited

FOREIGN PATENT DOCUMENTS

| CN | 1724477 A | 5/2005 |
|---|---|---|
| CN | 104496181 A * | 4/2015 |
| CN | 105131659 A | 8/2015 |

OTHER PUBLICATIONS

Machine translation of CN 104496181A. (Year: 2015).*

* cited by examiner

*Primary Examiner* — Catherine S Branch

(57) ABSTRACT

The invention discloses an anti-corrosion coating with low through-hole ratio for steel rebars. The composition of coating includes 45-70 weight percent feldspar powder, 15-30 weight percent borax, 10-20 weight percent calcium tetraborate, 5-15 weight percent fluorspar, 4-8 weight percent clay, 1-10 weight percent adhesion agent, and 1-1.5 weight percent thickener. This invention also discloses a coating method using above-mentioned anti-corrosion coating. The method includes seven steps: 1. dry mixing, 2. wet mixing, 3. pretreatment, 4. coating, 5. baking, 6. sintering, 7. cooling down at room temperature. The coating of this invention has outstanding anti-corrosion resistance, extremely high toughness, and good durability.

7 Claims, 3 Drawing Sheets

(51) Int. Cl.
  *B05D 3/00*  (2006.01)
  *B05D 3/02*  (2006.01)
  *C09D 1/04*  (2006.01)
  *C23D 3/00*  (2006.01)

ANTI-CORROSION COATING WITH LOW THROUGH-HOLE RATIO FOR STEEL REBARS AND COATING METHOD

CROSS REFERENCE TO RELATED APPLICATION

This application is a national stage application of International application number PCT/CN2017/075324, filed Mar. 1, 2017, titled "ANTI-CORROSION COATING WITH LOW THROUGH-HOLE RATIO FOR STEEL REBARS AND COATING METHOD," which claims the priority benefit of Chinese Patent Application No. 201610124012.4, filed on Mar. 4, 2016, which is hereby incorporated by reference in its entirety.

TECHNICAL FIELD

The present invention relates to metallic materials used for concrete structures, particularly, to an anti-corrosion coating with low through-hole ratio for steel rebars and coating method.

BACKGROUND

Entering the 21st century, China has entered the era of rapid economic development in the coastal area. It can be expected that there will be a large number of harbor terminals, cross-sea bridges, tunnels, offshore platforms constructed with reinforced concrete in the future. Rebar corrosion becomes an important factor which influences reinforced concrete durability. As a result, it is an urgent task for engineers in civil engineering to solve the rebar corrosion. Employing new materials and new technologies is a very effective way to solve the problem.

With the progress of rebar corrosion and protection mechanism research in reinforced concrete structures, the coating technology of steel rebars has been developed rapidly. At present, the coating technology can be divided into three types according to different coating materials: 1. metallic materials coated steel rebars: such as stainless steel thermal spray coated steel rebars, galvanized steel rebars, etc. 2. organic materials coated steel rebars: such as epoxy coated steel rebars. 3. inorganic materials coated steel rebars: such as phosphates coated steel rebars, enamels coated steel rebars, etc.

For engineering application, the cost of metallic materials coated steel rebars is 2-5 times higher than uncoated steel rebars. Therefore, metallic materials coated steel rebars cannot be widely used in large coastal engineering projects.

Epoxy coated steel rebars are usually produced by an electrostatic spraying method. The epoxy powder is sprayed on the surface of ribbed steel rebars and round steel rebars to form uniform coatings. As disclosed in "Epoxy coated steel rebars" (Chinese Patent CN201593271), epoxy coated steel rebars can solve the problem of rebar corrosion effectively, and improve the life of the buildings remarkably. Although epoxy coating has a good corrosion resistance, the adhesion force between concrete and epoxy coated steel rebars is significantly reduced, and the epoxy coating when exposed to ambient air, are oxidized easily, which seriously impairs its anti-corrosion capability.

As disclosed in "Double epoxy coated steel rebars and coating method" (Chinese Patent CN103074960), the double epoxy coated steel rebar is comprised of the substrate steel rebar, the inner layer coating, and the outer layer coating. The outer layer coating has a good wear resistance and corrosion resistance, which can meet the needs of construction projects in a harsh environment. But there are still some problems: 1. the adhesion force between the outer epoxy coating and concrete is still very weak. 2. precision equipment is needed to ensure the adhesion between outer and inner coatings. 3. the double layer coating doubles the cost and is uneconomical.

As disclosed in "Phosphate-based anticorrosive coating" (Chinese Patent CN104404502), the anti-corrosion coating can be applied in marine reinforced concrete, has a good adhesion force between coating and steel surface, also has a dense structure and high curing strength. As a matter of fact, these phosphate-based materials are adhesive and can be used for the repair of damaged concrete structures. However, the phosphate-based anticorrosive coating is easy to crack in a tension state.

The organic material coating will age in the sunny coastal environment. The inorganic material coating can overcome the aging problem, but the brittleness of coating increases significantly limiting its application in construction.

To solve the steel rebars corrosion problems in sea or coastal wet environment, there is a patent disclosing low-cost, high corrosion resistance, high toughness, and high durability coatings. However, the above-mentioned coatings show a high through-hole ratio. This invention can effectively decrease the through-hole ratio of the coating through tuning components to get better corrosion resistance.

DESCRIPTION OF THE INVENTION

To overcome the shortcomings of existing anti-corrosion coating technologies, this invention provides a low-cost, high corrosion resistance, high toughness coating with low through-hole ratio and a coating method.

To solve the steel rebars corrosion problems, this invention provides an anti-corrosion coating with low through-hole ratio, which is comprised of the following materials: 45-70 weight percent feldspar powder, 15-30 weight percent borax, 10-20 weight percent calcium tetraborate, 5-15 weight percent fluorspar, 4-8 weight percent clay, 1-10 weight percent adhesion agent, and 1-1.5 weight percent thickener.

Preferably, the feldspar powder passes through 800-1000 mesh sieve, and the fluorspar passes through 500-800 mesh sieve.

Preferably, the weight ratio of borax and feldspar powder is (0.21-0.67):1.

Preferably, the weight ratio of calcium tetraborate and feldspar powder is (0.14-0.45):1.

Preferably, feldspar powder is potassium feldspar powder.

Preferably, feldspar powder is syenite powder or sanidine powder.

Preferably, adhesion agent contains cobalt oxide, manganese dioxide, or nickel oxide, or a combination thereof.

Preferably, thickener contains methylcellulose or carboxymethylcellulose sodium, or a combination thereof.

Feldspars mostly show lamellar structure. Feldspar powder prefers to form numerous sheets stacked on the steel rebars during sintering. Simultaneously, lamellar crystalline feldspar has a high toughness along the sheet plane so that crystalline feldspar can endure great deformation of steel rebars when they are stretched longitudinally.

Borax is not only an important constituent to make the coating dense, but also can significantly reduce the sintering temperature, improve sintering performance. The synergetic effect of borax and feldspar powder can accelerate the formation of the coating. As an adhesion and flux agent, borax will melt earlier than feldspar powder, and then the melted borax will adhere to the surface of feldspar powder. Therefore, the sintering temperature can be reduced by incorporating an appropriate amount of borax. Less borax will lead to higher sintering temperature; on the contrary, an excessive amount of borax that cannot bind to feldspar powder will interfere with the formation of feldspar-borax structure and reduce structural strength of the coating.

As an important constituent of the coating matrix, calcium tetraborate, when mixed with borax, can lower sintering temperature. Meanwhile, calcium tetraborate does not contain crystalline water, which can greatly reduce the formation of through-holes arising from the evaporation of crystalline water. That is, none or few free water and crystalline water will be present to evaporate continuously with the increasing temperature during sintering stage, which otherwise would have created series of through-holes within the coating.

The thickener can change the viscosity of the coating at the room temperature, and the viscosity directly affects the degree of difficulty for the coating to bond rebar surfaces. The thin coating makes it difficult to bond to the steel substrate, reducing the thickness of the coating after sintering, and resulting in poor corrosion resistance. Meanwhile, too sticky of a coating leads a layer of coating on the steel surface that is too thick, which will change the original shape of rebar and lead to powder wasting and rising costs.

Clay is a type of refractory material that has a high melting point. A small amount of clay added into the mixed powder system can inhibit the stratification between powder and water, and promote the formation of the slurry.

The invention also discloses a coating method using a coating with low through-hole ratio in order to prevent or reduce rebar corrosion. The coating method includes the following steps.

1) Blending, or dry mixing: the feldspar powder, the borax, the calcium tetraborate, the fluorspar, the clay, the adhesion agent, and the thickener are weighed out according to a weight ratio described infra, placed in a container and mixed, and the container is placed in a mixing machine to mix thoroughly to yield a mixture A.

2) Wet mixing: water is added to the mixture A at a weight ratio of the mixture A to water (2-5):1, and thoroughly mixed to yield slurry coating B.

3) Pretreatment: rust on the surface of steel rebars is removed, and the surface of the steel rebars is washed and then dried.

4) Coating: the pretreated steel rebars are immersed in, rotated, and removed from the slurry coating B;

5) Baking: the coated steel rebars obtained from step 4 are placed at 90-130° C. for 20-40 minutes;

6) Sintering: wherein the baked steel rebars obtained from step 5 are placed into a furnace and heated up at the rate of 3-10° C./minute to 550-700° C. and maintained at 550-700° C. for 10 minutes 7) Cooling down at room temperature.

The baking temperature should be strictly controlled. Baking at too high a temperature will make the water in the coating evaporate rapidly, which leads to the expansion of inner coating and reduction of the coating density. Baking at too low a temperature will extend the drying time of coating and increase energy consumption.

The sintering temperature is controlled between 550° C. and 700° C., which can effectively reduce the presence of through-holes. When sintering temperature rises to 550° C., the process of internal water and gas evaporation away from the coating is substantially finished. During this process of water and gas evaporation away from the coating, or the water and gas removal process, voids or holes may be created and remain within the coating. When the voids or holes are connected, they may form through-holes that traverse the coating. When sintering temperature rises above 550° C., coating matrix begins to soften, and a tendency to shrink within the coating occurs. During the shrinking process, through-holes slowly close and form isolated blind holes or closed holes.

To solve the problems of mechanical deformation of steel rebars under vertical load and being prone to corrosion in water, in this invention, a protective coating is made from feldspar powder, borax and calcium tetraborate as main ingredients doped with trace amounts of other chemical ingredients. The ingredients are selected and optimized carefully and are melted to form a protective layer on the surface of steel rebars at high temperature. The protective layer has a dense three-dimensional structure with extremely high toughness. For the concrete structures located in the splash zone, the coating in this invention has a better durability than epoxy coated rebars. Compared with normal metal (e.g., zinc etc.) coating, dense sintering coating in this invention is not degraded or decomposed in seawater over time, which means the coating can effectively protect rebars in buildings from corrosion for a longer duration. By optimizing coating recipe, the internal structure of coating tends is dense, and the number of through-holes is significantly reduced, and corrosion resistance of the coating is significantly improved. In the invention, the ductile coating can elongate synergistically with steel rebars under an external force which ensures the structural integrity of the coating, so that the dense anti-corrosion coating can block and prevent the penetration and corrosion from outer corrosive substance.

The invention has the following advantages and positive effects: (1) The anti-corrosion coating has an outstanding corrosion resistance. With the coating sintered at high temperature, the corrosion resistance of the steel rebar is increased by about 4-6 times compared with normal steel rebars, which is due to the low through-hole ratio of the coating. (2) The anti-corrosion coating has an extremely high toughness or ductility. As a result the coating can elongate synergistically with steel rebars under tensional stress and ensure the structural integrity of the coating. (3) The anti-corrosion coating has a strong durability. The coating, sintered at high temperature, belongs to an inorganic material and has strong durability; as a result, it can function effectively for a long time.

In summary, the remarkable advantages of the coating in the invention are simple preparation process, low cost, high strength, high sealing capacity, high anti-corrosion function, high toughness, low through-hole ratio and good corrosion resistance.

DETAILED DESCRIPTION OF THE PREFERRED EMBODIMENTS

Figure 1:
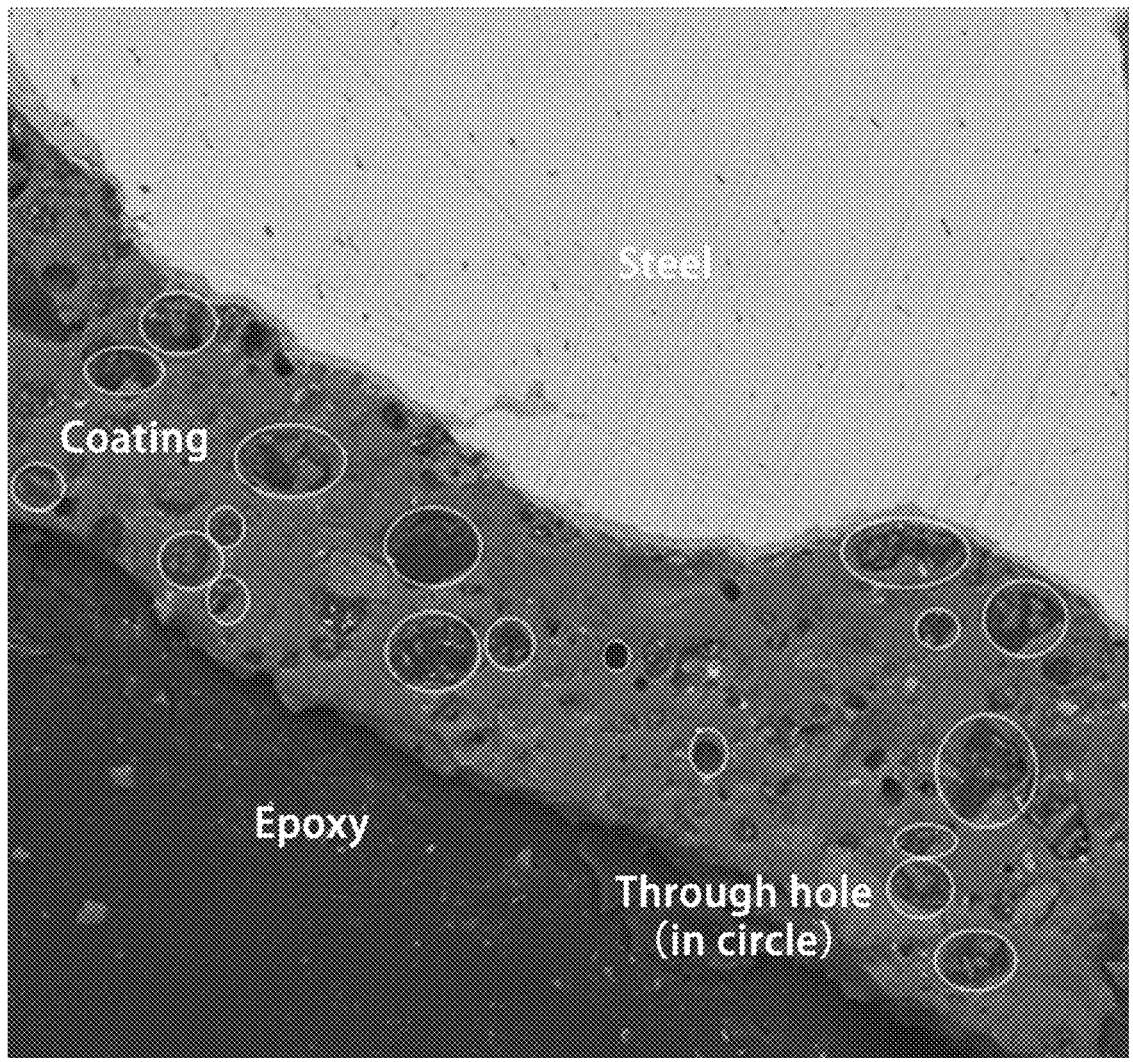
FIG. 1 shows a SEM image of an ordinary anti-corrosion coating.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments, and its several details are capable of modifications in various obvious respects, all without departing from the spirit and the scope of the present invention. Accordingly, the drawings and detailed description are to be regarded as illustrative in nature and not as restrictive. It is to be noted that various changes and modifications practiced or adopted by those skilled in the art without creative work are to be understood as being included within the scope of the present invention as defined by the appended claims.

Embodiment 1

Pretreatment: A section of steel rebar is selected, buffed with abrasive paper and washed with 5% diluted sulfuric acid to remove rust, then cleaned with water, and finally dried for subsequent use.

Preparation of slurry coating: syenite powder passes through 800 mesh sieve, fluorspar passes through 500 mesh sieve. First, 45 weight percent syenite powder, 28 weight percent borax, 12 weight percent calcium tetraborate, 5 weight percent fluorspar, 5 weight percent clay, 3.8 weight percent cobalt oxide, and 1.2 weight percent methylcellulose are weighed and placed in a material tank and mixed by stir bar for 30 seconds. The weight ratios of borax to syenite powder and calcium tetraborate to syenite powder are 0.62:1 and 0.27:1, respectively. The material tank is placed into a mixing machine to dry mix, i.e., without adding water, for 3-5 minutes to yield a well-dispersed mixture A. After dry mixing, 50 weight percent water is added to the mixture A, wherein the weight ratio of the mixture A to water is 2:1, the mixture is stirred until it turns slurry. Then the material tank is placed into the mixing machine to mix for 5-7 minutes to yield a well-dispersed slurry coating B. The slurry coating B is poured out and let stand for 10 minutes in the container. After monitoring that there is no stratification and no water on the top of the slurry, the slurry coating B is poured into a storage container for further use.

Coating: The pretreated steel rebar is immersed in the slurry coating B with an iron clamp, and while keeping the steel rebar in rotation, the steel rebar is pulled out from the slurry coating B slowly. The coating B is well and evenly coated on the surface of the steel rebar.

Baking: the coated steel rebar obtained from the slurry coating B is supported on two refractory blocks in an oven, and baked at 90° C. for 20 minutes.

Sintering: the baked steel rebar is taken out from the oven, placed in an electric furnace and heated up at a rate of 5° C./min to 560° C. and maintained at 560° C. for 10 minutes. The furnace is turned off and cooled to room temperature. The steel rebar with an anti-corrosion coating with low through-hole ratio is obtained.

Embodiment 2

Pretreatment: the same as embodiment 1.

Preparation of slurry coating: Sanidine powder passes through 900 mesh sieve, fluorspar passes through 625 mesh sieve. First, 57 weight percent sanidine powder, 15 weight percent borax, 13.2 weight percent calcium tetraborate, 6 weight percent fluorspar, 6 weight percent clay, 1.5 weight percent manganese dioxide, and 1.3 weight percent carboxymethylcellulose sodium are weighed and poured into a material tank, and then mixed by a stir bar for 30 seconds. The weight ratios of borax to sanidine powder and calcium tetraborate to transparent powder are 0.26:1 and 0.23:1, respectively. The material tank is placed into a mixing machine to dry mix, i.e., without adding water, for 3-5 minutes to yield a well-dispersed mixture A. After dry mixing, 50 weight percent water is added to the mixture A, wherein the weight ratio of the mixture A to water is 2:1, the mixture is stirred until it turns slurry. Then the material tank is placed into the mixing machine to mix for 5-7 minutes to yield a well-dispersed slurry coating B. The slurry coating B is poured out and let stand for 10 minutes in a container. After monitoring that there is no stratification and no water on the top of the slurry, the slurry coating B is poured into a storage container for further use.

Coating: the same as embodiment 1.

Baking: the coated steel rebar obtained from the slurry coating B is supported on two refractory blocks in an oven, and baked at 100° C. for 20 minutes.

Sintering: The baked steel rebar is taken out from the oven, placed in an electric furnace and heated up at a rate of 8° C./min to 620° C. and maintained at 620° C. for 10 minutes. The furnace is turned off and cooled to room temperature. The steel rebar with an anti-corrosion coating with low through-hole ratio is obtained.

Embodiment 3

Pretreatment: the same as embodiment 1.

Preparation of slurry coating: Syenite powder passes through 800 mesh sieve, fluorspar passes through 800 mesh sieve. First, 49 weight percent syenite powder, 16 weight percent borax, 10.6 weight percent calcium tetraborate, 9.5 weight percent fluorspar, 5.5 weight percent clay, 4.2 weight percent cobalt oxide, 4 weight percent nickel oxide, and 1.2 weight percent methylcellulose are weighed and poured into a material tank, and mixed by a stir bar for 30 seconds. The weight ratios of borax to syenite powder and calcium tetraborate to syenite powder are 0.33:1 and 0.22:1, respectively. The material tank is placed into a mixing machine to dry mix, i.e., without adding water, for 3-5 minutes to yield a well-dispersed mixture A. After dry mixing, 40 weight percent water is added to the mixture A, wherein the weight ratio of the mixture A to water is 2.5:1, the mixture is stirred until it turns slurry. Then the material tank is placed into the mixing machine to mix for 5-7 minutes to yield a well-dispersed slurry coating B. The slurry coating B is poured out and let stand for 10 minutes in a container. After monitoring that there is no stratification and no water on the top of the slurry, the slurry coating B is poured into a storage container for further use.

Coating: the same as embodiment 1.

Baking: the coated steel rebar obtained from the slurry coating B is supported on two refractory blocks in the oven, and baked at 100° C. for 20 minutes.

Sintering: the baked steel rebar is taken out from the oven, placed in an electric furnace and heated up at a rate of 5° C./min to 650° C. and maintained at 650° C. for 10 minutes. The furnace is turned off and cooled to room temperature. The steel rebar with an anti-corrosion coating with low through-hole ratio is obtained.

Embodiment 4

Pretreatment: the same as embodiment 1.

Preparation of slurry coating: syenite powder passes through 800 mesh sieve, fluorspar passes through 625 mesh sieve. First, 46 weight percent syenite powder, 15 weight percent borax, 19 weight percent calcium tetraborate, 10.6 weight percent fluorspar, 4.2 weight percent clay, 3.2 weight percent cobalt oxide, and 1.1 weight percent methylcellulose are weighed and poured into a material tank and mixed by a stir bar for 30 seconds. The weight ratios of borax to syenite powder and calcium tetraborate to syenite powder are 0.33:1 and 0.41:1, respectively. The material tank is placed into a mixing machine to dry mix, i.e., without adding water, for 3-5 minutes to yield a well-dispersed mixture A. After dry mixing, 40 weight percent water is added to the mixture A, wherein the weight ratio of the mixture A to water is 2.5:1, the mixture is stirred until it turns slurry. Then the material tank is placed into the mixing machine to mix for 5-7 minutes to yield a well-dispersed slurry coating B. The slurry coating B is poured out and let stand for 10 minutes in the container. After monitoring that there is no stratification and no water on the top of the slurry, the slurry coating B is poured into a storage container for further use.

Coating: the same as embodiment 1.

Baking: the coated steel rebar obtained from the slurry coating B is supported on two refractory blocks in an oven, and baked at 90° C. for 30 minutes.

Sintering: the baked steel rebar is taken out from the oven, placed in an electric furnace and heated up at a rate of 5° C./min and maintained at 670° C. for 10 minutes. The furnace is turned off and cooled to room temperature. The steel rebar with an anti-corrosion coating with low through-hole ratio is obtained.

Embodiment 5

Pretreatment: the same as embodiment 1.

Preparation of slurry coating: syenite powder passes through 800 mesh sieve, fluorspar passes through 625 mesh sieve. First, 55 weight percent syenite powder, 15 weight percent borax, 12.1 weight percent calcium tetraborate, 5.5 weight percent fluorspar, 4.5 weight percent clay, 3.5 weight percent cobalt oxide, 3 weight percent manganese dioxide, and 1.4 weight percent methylcellulose are weighed and poured into a material tank, and mixed with stir bar for 30 seconds. The weight ratios of borax to syenite powder and calcium tetraborate to syenite powder are 0.27:1 and 0.22:1, respectively. The material tank is placed into a mixing machine to dry mix, i.e., without adding water, for 3-5 minutes to yield a well-dispersed mixture A. After dry mixing, 40 weight percent water is added to the mixture A, wherein the weight ratio of the mixture A to water is 2.5:1, the mixture is stirred until it turns slurry. Then the material tank is placed into the mixing machine to mix for 5-7 minutes to yield a well-dispersed slurry coating B. The slurry coating B is poured out and let stand for 10 minutes in the container. After monitoring that there is no stratification and no water on the top of the slurry, the slurry coating B is poured into a storage container for further use.

Coating: the same as embodiment 1.

Baking: the coated steel rebar obtained from the slurry coating B is supported on two refractory blocks in an oven, and baked at 130° C. for 20 minutes.

Sintering: The baked steel rebar is taken out from the oven, placed in an electric furnace and heated up at a rate of 5° C./min to 680° C. and maintained at 680° C. for 10 minutes. Finally, the furnace is turned off and cooled to room temperature. The steel rebar with an anti-corrosion coating with low through-hole ratio is obtained.

To verify the effect of corrosion resistance of the coating with low through-hole ratio for steel rebars and coating method, tests are conducted and analyzed.

1) Three groups of corrosion tests have been done. In each group, three coated steel rebars and three uncoated steel bars are placed into 5% sodium chloride solution simultaneously; an electric current is applied to accelerate the corrosion process, which nonetheless mimics natural corrosion process except for the accelerated pace. The total number of test steel rebars is 18.

TABLE 1

The accelerated corrosion test of steel rebars.

| Corrosion time (h) | | Rebar No. 1 | Rebar No. 2 | Rebar No. 3 | Average |
|---|---|---|---|---|---|
| Group 1 | uncoated | 132 | 154 | 195 | 160 |
| | coated | 975 | 970 | 903 | 949 |
| Group 2 | uncoated | 121 | 107 | 191 | 140 |
| | coated | 1036 | 1045 | 1048 | 1043 |
| Group 3 | uncoated | 198 | 180 | 126 | 168 |
| | coated | 937 | 913 | 966 | 939 |

From Table 1, the coated steel rebars with low through-hole ratio are placed into 5% sodium chloride solution, and the corrosion resistance of coated steel rebars is 4-6 times better than that of uncoated steel rebars. Therefore, the coated steel rebars with low through-hole ratio coating can effectively delay and reduce corrosion in seawater.

2) Three groups of tension tests were done. In each group, three coated steel rebars are tested, and each coated steel rebar is attached with two electric resistance strain gauges. At the beginning of the test, the steel rebar is placed on the tensile testing machine to measure the strain change with the load, and the strain gauge connected to strain instrument is used to measure the strain change on the coated steel rebar.

TABLE 2

Tension test of steel rebars.

| | | Strain value of coating cracking (u eps) | | |
|---|---|---|---|---|
| | | Point 1 | Point 2 | Average |
| Group 1 | Rebar No. 1 | 1692 | 1751 | 1721 |
| | Rebar No. 2 | 1643 | 1662 | 1652 |
| | Rebar No. 3 | 1727 | 1675 | 1701 |
| Group 2 | Rebar No. 1 | 1705 | 1604 | 1654 |
| | Rebar No. 2 | 1751 | 1685 | 1718 |
| | Rebar No. 3 | 1794 | 1645 | 1719 |
| Group 3 | Rebar No. 1 | 1611 | 1706 | 1658 |
| | Rebar No. 2 | 1762 | 1620 | 1691 |
| | Rebar No. 3 | 1797 | 1777 | 1787 |

Note: the strain is dimensionless, and one strain=106 u eps.

For the steel rebars used in building, yield strength and corresponding yield strain value is one important index worth paying attention to. Structure designers should follow GB 50010-2010 concrete structure design specifications.

3) Electron microscope observation

The steel rebar with anti-corrosion coating of this invention is placed in a mould of the electron microscope, epoxy resin is injected into the mould and stands for one day to solidification. Then the steel rebar with epoxy resin is taken out from the mold, polished using the polishing machine. The morphology of steel rebar with anti-corrosion coating is observed through the scanning electron microscope, which is shown in FIG. 2. At the same time, the morphology of steel rebar with the ordinary coating is also observed through the scanning electron microscope, which is shown in FIG. 1.

Some holes are formed inside of coating due to the evaporation of crystalline water, free water, and gas, and the holes can be divided into through-holes and closed holes. The corrosion resistance of coating on steel rebar is due to the complete isolation of steel rebar from outer corrosive substance. The closed holes of coating do not affect the isolation, while the through-holes destroy the isolation, which can lead to outer corrosive substances penetrating into the coating and come in contact with the steel. When there are cracks or through-holes in the coating, pitting corrosion of the rebar is liable to occur. In other words, the through-holes seriously reduce the corrosion resistance of the coating, and the closed holes do not reduce the corrosion resistance of the coating.

Figure 3:
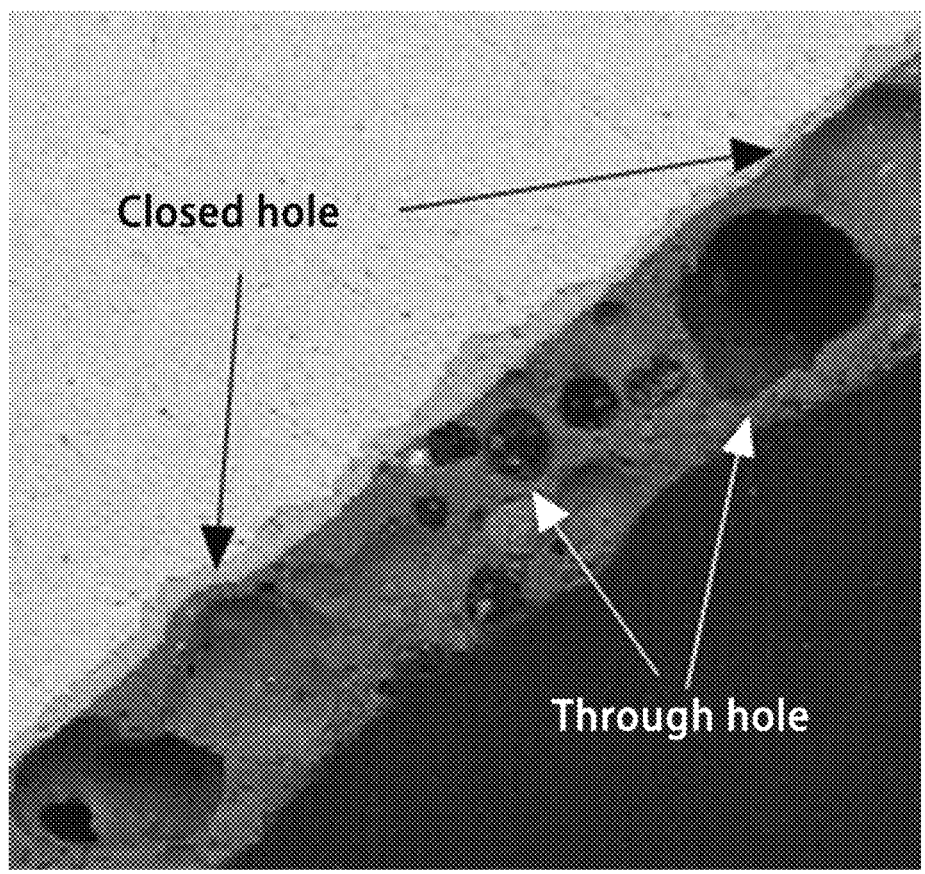
FIG. 3 shows the magnified image of an area in FIG. 2.

The morphology of through-holes and closed holes are shown in FIG. 3. Through the SEM-BSE image, it is clearly found that the through-holes are filled with liquid epoxy resin when the epoxy resin is coated on the steel rebar in the vacuum. Due to the penetration of epoxy resin, the through-holes and the layer of epoxy resin have the same color under the scanning electron microscope. However, the inner of the closed holes and the anti-corrosion coating have the approximately same color.

Figure 2:
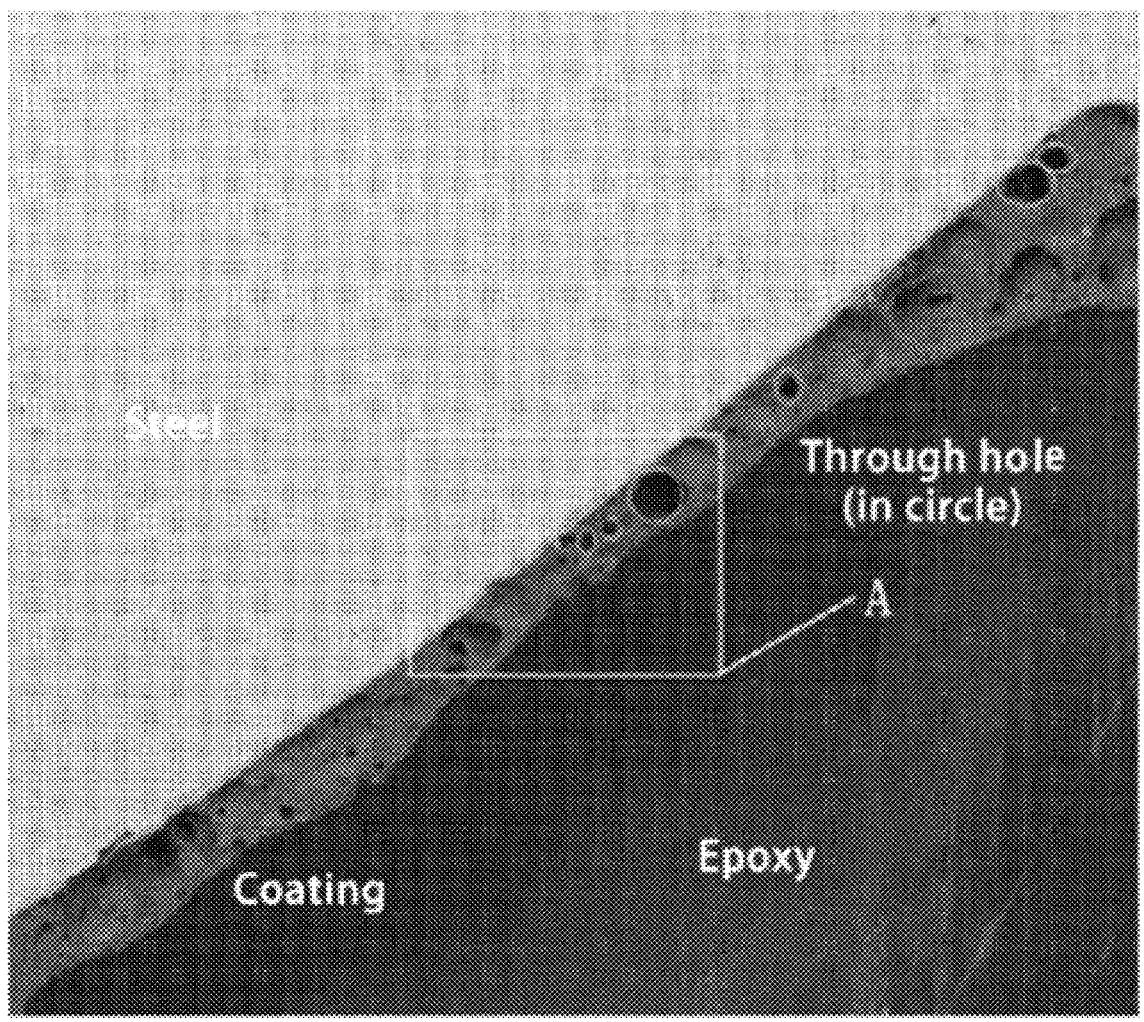
FIG. 2 shows a SEM image of an anti-corrosion coating, according to one embodiment of the invention.

Compared with FIG. 1, FIG. 2 clearly shows that the number of the through-holes in the coating of the invention is significantly fewer than that of ordinary coatings. Since the number of the through-holes has an important effect on the corrosion resistance, the coating of this invention has a better corrosion resistance.

While the invention has been particularly shown and described as referenced to the embodiments thereof, those skilled in the art will understand that the foregoing and other changes in form and detail may be made therein without departing from the spirit and scope of the invention.

What is claimed is:

1. An anti-corrosion coating with low through-hole ratio, the anti-corrosion coating comprising:

45-70 weight percent feldspar powder, 15-30 weight percent borax, 10-20 weight percent calcium tetraborate, 5-15 weight percent fluorspar, 4-8 weight percent clay, 1-10 weight percent adhesion agent, and 1-1.5 weight percent thickener.

2. The anti-corrosion coating of claim 1, wherein the feldspar powder is capable of passing through a 800-1000 mesh sieve, and the fluorspar is capable of passing through a 500-800 mesh sieve.

3. The anti-corrosion coating of claim 1, wherein the feldspar powder is potassium feldspar powder.

4. The anti-corrosion coating of claim 1, wherein the feldspar powder is syenite powder or sanidine powder.

5. The anti-corrosion coating of claim 1, wherein the adhesion agent comprises cobalt oxide, manganese dioxide, or nickel oxide, or a combination thereof.

6. The anti-corrosion coating of claim 1, wherein the thickener comprises methylcellulose or carboxymethylcellulose sodium, or a combination thereof.

7. A method of coating steel rebars with the anti-corrosion coating of claim 1, wherein the method comprises the steps of:

1) blending, without adding water, a mixture comprising the feldspar powder, the borax, the calcium tetraborate, the fluorspar, the clay, the adhesion agent, and the thickener that are weighted out according to a weight percent composition of claim 1, wherein the mixture is placed in a container, stirred, and placed into a mixing machine to mix thoroughly to yield a mixture A;

2) adding water to the mixture A at a weight ratio of the mixture A to water (2-5):1 into the container, which is placed into a mixing machine to thoroughly mix to yield a slurry coating B;

3) pretreating steel rebars by removing rust of the steel rebars such that a surface of the steel rebars is washed and then dried;

4) coating the pretreated steel rebars obtained from step 3 such that the steel rebars are immersed in, rotated, and removed from the slurry coating B;

5) baking the coated steel rebars obtained from step 4 at 90-130° C. for 20-40 minutes;

6) sintering the baked steel rebars obtained from step 5 using a furnace such that the baked steel rebars obtained are heated up at a rate of 3-10° C./minute to 550-700° C. and maintained at 550-700° C. for 10 minutes; and 7) cooling down the sintered steel rebars at room temperature.

* * * * *